UNITED STATES PATENT OFFICE.

HARRY C. POWERS, OF BROOKLYN, NEW YORK, ASSIGNOR TO D. L. HAINES, OF BROOKLYN, NEW YORK.

PROCESS OF MAKING ZINC PRINTING-PLATES.

1,198,763.  Specification of Letters Patent.  Patented Sept. 19, 1916.

No Drawing.  Application filed February 18, 1916.  Serial No. 79,143.

*To all whom it may concern:*

Be it known that I, HARRY C. POWERS, a citizen of the United States, and resident of the borough of Brooklyn, county of Kings, city and State of New York, have invented certain new and useful Improvements in Processes of Making Zinc Printing-Plates, of which the following is a specification.

My invention relates to the manufacture of printing plates from zinc, especially for so-called half-tone work, and has for its object to provide a method whereby plates having a very sharp definition and great durability may be obtained in a simple and inexpensive manner.

At ordinary temperatures, zinc cannot be conformed satisfactorily by pressure, to the features of a matrix of the desired character, but when both the zinc and the matrix are heated to temperatures about 212° Fahrenheit, such conformation or molding takes place readily, and on this peculiarity I have based my improved process of making zinc printing-plates. Other features of my invention will be set forth in the description following hereinafter, and particularly pointed out in the appended claims.

In carrying out my invention, I take a matrix of lead alloy or any other suitable, sufficiently hard material which does not soften appreciably at temperatures around 212°, and place said matrix on a suitable support, with the molding or irregular face of the matrix facing up, so as to be exposed. Against this exposed molding surface I place, in surface contact, that is to say, flatwise, a piece of sheet-zinc of approximately the same size as the matrix and of proper thickness to allow of its being readily molded during the subsequent pressure operation. On top of the zinc plate, I then place a pad of felt or other suitable yielding material, generally of considerably greater thickness than the zinc plate. The upper surface of this pad is adapted to be engaged by the plunger of the press employed to exert pressure on the zinc plate toward the matrix so as to mold the plate into the irregularities of the matrix surface. Before such pressure is exerted, however, the zinc plate, and preferably also the molding matrix, are heated to a temperature around 212°; this being the temperature at which water boils, it is very easy to obtain and maintain this exact temperature, if desired. When heated to 212° or thereabout, zinc becomes plastic to a sufficient extent to allow of its being readily molded by pressure, under the conditions set forth, yet after cooling off, the zinc plate becomes very hard again, and is extremely durable, its molded surface being able to withstand a great many impressions before it becomes unserviceable or even appreciably deteriorated. I find it desirable, in order to secure the best results, to oil the zinc plate, before it is molded by pressure, at least on the surface which comes in contact with the matrix; for this purpose I may employ any tempering oil, say crude oil. The oiling of the plate may be effected most simply by dipping it in oil, in which case both faces of the plate will become oiled. The use of oil in this manner insures a more perfect molding and also, to some extent, hardens the surface of the printing plate and thus increases its durability. According to the greater or less purity of the zinc forming the printing plate, the temperature employed will preferably be higher or lower.

If desired, I may place the zinc plate on the support, then the matrix, molding face downward, on the zinc plate, then the pad on top of the matrix, and finally the press plunger against the upper face of the pad. In either event, I generally prefer to place the smoothest surface of the zinc plate in contact with the molding surface of the matrix.

I claim as my invention:

1. The herein described process of making zinc printing-plates, which consists in pressing a zinc plate against a matrix which does not soften appreciably at temperatures of about 212° Fahrenheit, both the matrix and the zinc plate being at a temperature of about 212° Fahrenheit during such pressure.

2. The herein described process of making zinc printing-plates, which consists in pressing a zinc plate, of a temperature at which zinc becomes plastic, against a matrix made of a material which does not soften appreciably at such temperature.

3. The herein described process of making zinc printing-plates, which consists in placing one face of a zinc plate, of a temperature of about 212° Fahrenheit, against a matrix which does not soften appreciably at such temperature, placing one surface of a pad against the other face of said plate, and exerting pressure against the other surface of said pad.

4. The herein described process of making zinc printing-plates, which consists in oiling that surface of the plate which is to become the printing-surface, and then pressing said surface, while at a temperature at which zinc becomes plastic, against a matrix which does not soften appreciably at such temperature.

5. The herein described process of making zinc printing plates, which consists in pressing a zinc plate against a matrix under temperature conditions at which the material of the matrix is harder than that of the zinc plate.

In testimony whereof I have signed this specification.

HARRY C. POWERS.

Copies of this patent may be obtained for five cents each, by addressing the "Commissioner of Patents, Washington, D. C."